(12) United States Patent
Wang et al.

(10) Patent No.: US 7,317,991 B2
(45) Date of Patent: Jan. 8, 2008

(54) MULTICOMPONENT INDUCTION MEASUREMENTS IN CROSS-BEDDED AND WEAK ANISOTROPY APPROXIMATION

(75) Inventors: Tsili Wang, Katy, TX (US); Daniel T. Georgi, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 56 days.

(21) Appl. No.: 11/321,497

(22) Filed: Dec. 29, 2005

(65) Prior Publication Data

US 2006/0161350 A1 Jul. 20, 2006

Related U.S. Application Data

(60) Provisional application No. 60/644,882, filed on Jan. 18, 2005.

(51) Int. Cl.
*G01V 3/18* (2006.01)
(52) U.S. Cl. .......................................................... 702/7
(58) Field of Classification Search .................... 702/6, 702/7, 9, 10, 11, 12, 13
See application file for complete search history.

(56) References Cited

U.S. PATENT DOCUMENTS

| | | | |
|---|---|---|---|
| 4,837,517 A | 6/1989 | Barber | |
| 5,157,605 A | 10/1992 | Chandler et al. | |
| 5,452,761 A | 9/1995 | Beard et al. | |
| 5,999,883 A | 12/1999 | Gupta et al. | |
| 6,466,872 B1 | 10/2002 | Kriegshauser et al. | |
| 6,470,274 B1 | 10/2002 | Mollison et al. | |
| 6,493,632 B1 | 12/2002 | Mollison et al. | |
| 6,618,676 B2 | 9/2003 | Kriegshauser et al. | |
| 6,643,589 B2 | 11/2003 | Zhang et al. | |
| 6,686,736 B2 | 2/2004 | Schoen et al. | |
| 6,711,502 B2 | 3/2004 | Mollison et al. | |
| 2002/0017905 A1 | 2/2002 | Conti | 324/339 |
| 2002/0173913 A1 | 11/2002 | Tabarovsky et al. | 702/7 |
| 2002/0173914 A1 | 11/2002 | Zhang et al. | 702/7 |
| 2003/0025503 A1 | 2/2003 | Fanini et al. | 324/339 |
| 2003/0028324 A1 | 2/2003 | Xiao et al. | 702/7 |
| 2003/0055565 A1 | 3/2003 | Omeragic | 702/7 |
| 2003/0055566 A1 | 3/2003 | Kriegshauser et al. | 702/7 |
| 2003/0057950 A1 | 3/2003 | Gao et al. | 324/339 |
| 2003/0076107 A1 | 4/2003 | Fanini et al. | 324/339 |
| 2003/0093223 A1 | 5/2003 | Zhang et al. | 702/7 |
| 2003/0105591 A1 | 6/2003 | Hagiwara | 702/7 |

(Continued)

OTHER PUBLICATIONS

Moran et al., Effects Of Formation Anisotropy On Resistivity-Logging Measurements, Geophysics, vol. 44, No. 7, Jul. 1979, pp. 1266-1286.

(Continued)

*Primary Examiner*—Donald E McElheny, Jr.
(74) *Attorney, Agent, or Firm*—Madan, Mossman & Sriram, P.C.

(57) ABSTRACT

Multicomponent measurements made in a cross-bedded earth formation are processed to give one or more equivalent TI models. Resistivity information about the cross-bedding is obtained from one of the TI models and a measured cross-bedding angle. Resistivity information about the cross-bedding may also be obtained using a combination of two or more of the equivalent TI models.

20 Claims, 9 Drawing Sheets

U.S. PATENT DOCUMENTS

| | | | |
|---|---|---|---|
| 2003/0117142 A1 | 6/2003 | Amini | 324/339 |
| 2003/0146752 A1 | 8/2003 | Gianzero et al. | 324/343 |
| 2003/0229449 A1 | 12/2003 | Merchant et al. | 702/7 |
| 2004/0059511 A1 | 3/2004 | Thomann et al. | 702/6 |
| 2004/0059512 A1 | 3/2004 | Thomann et al. | 702/6 |
| 2004/0059515 A1 | 3/2004 | Kennedy | 702/7 |
| 2004/0100263 A1 | 5/2004 | Fanini et al. | 324/339 |
| 2004/0117120 A1 | 6/2004 | Frenkel et al. | 702/7 |
| 2004/0133351 A1 | 7/2004 | Frenkel et al. | 702/7 |
| 2004/0140811 A1 | 7/2004 | Conti | 324/338 |
| 2004/0145370 A1 | 7/2004 | Conti | 324/339 |
| 2004/0196046 A1 | 10/2004 | Aidan et al. | 324/339 |
| 2004/0196047 A1 | 10/2004 | Fanini et al. | 324/339 |
| 2004/0207403 A1 | 10/2004 | Fanini et al. | 324/339 |
| 2004/0249572 A1 | 12/2004 | Benimeli | 702/7 |
| 2005/0017722 A1 | 1/2005 | Ellingsrud et al. | 324/334 |
| 2005/0049792 A1 | 3/2005 | Yu et al. | 702/7 |
| 2005/0122116 A1 | 6/2005 | Yu et al. | 324/339 |
| 2005/0156602 A1 | 7/2005 | Conti | 324/339 |
| 2005/0252819 A1 | 11/2005 | Chum | 324/367 |
| 2005/0256645 A1 | 11/2005 | Rabinovich et al. | 702/7 |
| 2006/0106541 A1 | 5/2006 | Hassan et al. | 702/6 |

OTHER PUBLICATIONS

Klein et al., The Petrophysics Of Electrically Anisotropic Reservoirs, SPWLA 36$^{th}$ Annual Logging Symposium, Jun. 26-29, 1995, pp. 1-12.

Anderson et al., The Effect Of Crossbedding Anisotropy On Induction Tool Response, SPWLA 39$^{th}$ Annual Logging Symposium, May 26-29, 1998, pp. 1-14.

Kennedy et al., Conductivity Anisotropy In Shale-Free Sandstone, SPWLA 44$^{th}$ Annual Logging Symposium, Jun. 22-25, 2003, pp. 1-14.

Wang et al., Multicomponent Induction Response in Cross Bedding And A Weak-Anisotropy Approximation, pp. 1-4.

MULTICOMPONENT INDUCTION MEASUREMENTS IN CROSS-BEDDED AND WEAK ANISOTROPY APPROXIMATION

CROSS-REFERENCES TO RELATED APPLICATIONS

This application claims priority from U.S. Provisional Patent Application Ser. No. 60/644,882 filed on 18 Jan. 2005.

BACKGROUND OF THE INVENTION

1. Field of the Invention

The invention is related generally to the use of resistivity measurements for evaluation of earth formations having cross-bedding.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

The physical principles of electromagnetic induction well logging are described, for example, in, H. G. Doll, Introduction to Induction Logging and Application to Logging of Wells Drilled with Oil Based Mud, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al, (the "Gupta patent"), the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

U.S. Pat. No. 6,466,872 to Kriegshauser et al. having the same assignee as the present application and the contents of which are fully incorporated herein by reference discloses use of a multi-component logging tool for determination of anisotropic resistivity parameters of a laminated reservoir. As would be known to those versed in the art, such a laminated reservoir that has layers of different resistivities exhibits transverse isotropy even if the layers themselves are isotropic. Such a multicomponent logging tool has azimuthal sensitivity. Kriegshauser discloses a method of analyzing data from a multicomponent logging tool to determine water saturations of the sand and shale fractions of the reservoir. The model used in Kriegshauser assumes that the anisotropy axis is normal to the bedding plane. Similar models have been assumed in, for example, in U.S. Pat. No. 6,618,676 to Kriegshauser et al., and in U.S. Pat. No. 6,643,589 to Zhang et al.

Certain types of hydrocarbon reservoirs include cross-bedding wherein within geologic markers (or beds) there is additional fine bedding (cross-bedding) with a different dip than the main bedding. Cross bedding typically occur in three major environments: (1) aeolian, (2) subaqueous delta, and (3) river channels. Due to variations in grain size, cementation, water saturation and other factors, cross-bedding usually displays resistivity anisotropy (Kennedy and Herrick, 2003). On a fine scale, the resistivity perpendicular to the cross-bedding planes is in general higher than that parallel to the cross-bedding plane. Accurate reservoir evaluation and description must consider the resistivity dependence with direction.

However, little has been understood about multicomponent induction responses in cross-bedded formations. Anderson et al. (1998) studied cross-bedding effects on coaxial-coil arrays but gave no results for multicomponent arrays. Difficulties arise in simulating induction response to a cross-bedded formation because, in the presence of a borehole, the problem must be dealt with as a general 3-D problem. The solution of the EM field quantities in Anderson takes the form of a triple Fourier integral. Anderson shows modeling results but provides little insight on the inverse problem of interpreting measured results even for coaxial arrays. It is desirable to reduce the complexity of the problem for numerical simulation and data interpretation. The present invention addresses this problem.

SUMMARY OF THE INVENTION

One embodiment of the invention is an apparatus for and a method of evaluating an earth formation wherein the earth formation includes cross-bedding. Multicomponent resistivity measurements are obtained in a borehole in the earth formation. The cross0beeed formation is represented by an approximate model having transverse isotropy. A parameter of the approximate model is estimated using the multicomponent measurements. The approximate model may include a bi-axially anisotropic model. The borehole may have an axis substantially normal to a main bedding of the earth formation. The method may further include determination of an angle of cross-bedding, and using the angle of cross-bedding for determining horizontal and vertical conductivities characterizing the cross-bedding. The method may further include determination of a water saturation of the cross-bedded interval, a shale fraction of the cross-bedded interval, a coarse-grained fraction of the cross-bedded interval, a fine-grained fraction of the cross-bedded interval, a permeability of a fine grained fraction of the cross-bedded interval and/or a permeability of a coarse-grained fraction of the cross bedded interval. The multi-component measurements may include a principal component.

Another embodiment of the invention is an apparatus for evaluating an earth formation having a cross-bedded interval. A multi-component logging tool obtains multi-component measurements in a borehole in the earth formation. A processor uses an approximate model having transverse isotropy to represent the cross-bedded formation and estimates from the multicomponent measurements a parameter of the approximate model. The approximate model used by the processor may be a bi-axially anisotropic model. The borehole may have an axis substantially normal to a main bedding of the earth formation. The processor may further determine an angle of cross-bedding and use the angle of cross-bedding to estimate a horizontal conductivity and a vertical conductivity characterizing the cross-bedding. The apparatus may further include an acoustic imaging tool and/or a resistivity imaging tool and the processor may determine the cross-bedding based at least in part on an output of the imaging tool. The processor may further determine a water saturation of the cross-bedded interval, a shale fraction of the cross-bedded interval, a coarse grained fraction of the cross-bedded interval, a fine grained fraction of the cross-bedded interval, a permeability of a fine grained fraction of the cross-bedded interval, and/or a permeability of a coarse grained fraction of the cross-bedded interval. The multicomponent measurements may include a principal component. The apparatus may include a wireline, a drilling tubular or a slickline for conveying the logging tool into the borehole. The processor may be downhole, at a surface location or at a remote location.

Another embodiment of the invention is a computer readable medium for use with an apparatus for evaluating an earth formation having a cross-bedded interval. The apparatus includes a multicomponent logging tool which obtains multicomponent measurements in a borehole in the earth formation. The medium includes instructions which enable a processor to use an approximate model having transverse isotropy to represent the cross-bedded formation, and to estimate from the multicomponent measurements a parameter of the approximate model. The medium may be a ROM, an EPROM, an EEPROM, a flash memory, and/or an optical disk.

BRIEF DESCRIPTION OF THE FIGURES

The present invention is best understood with reference to the following figures in which like numbers refer to like components and in which.

DETAILED DESCRIPTION OF THE INVENTION

Figure 1:
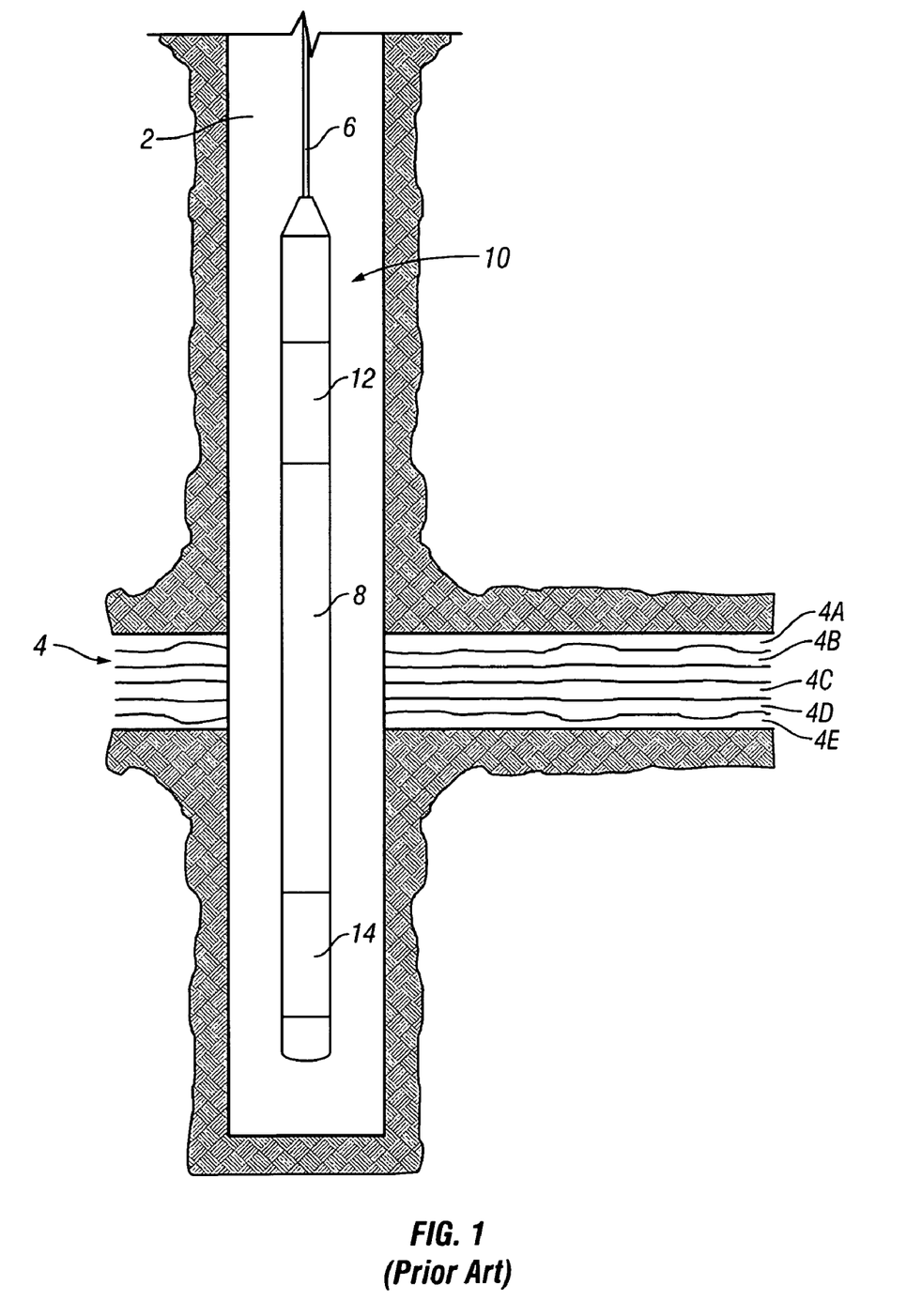
FIG. 1 (prior art) illustrates an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor for controlling the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
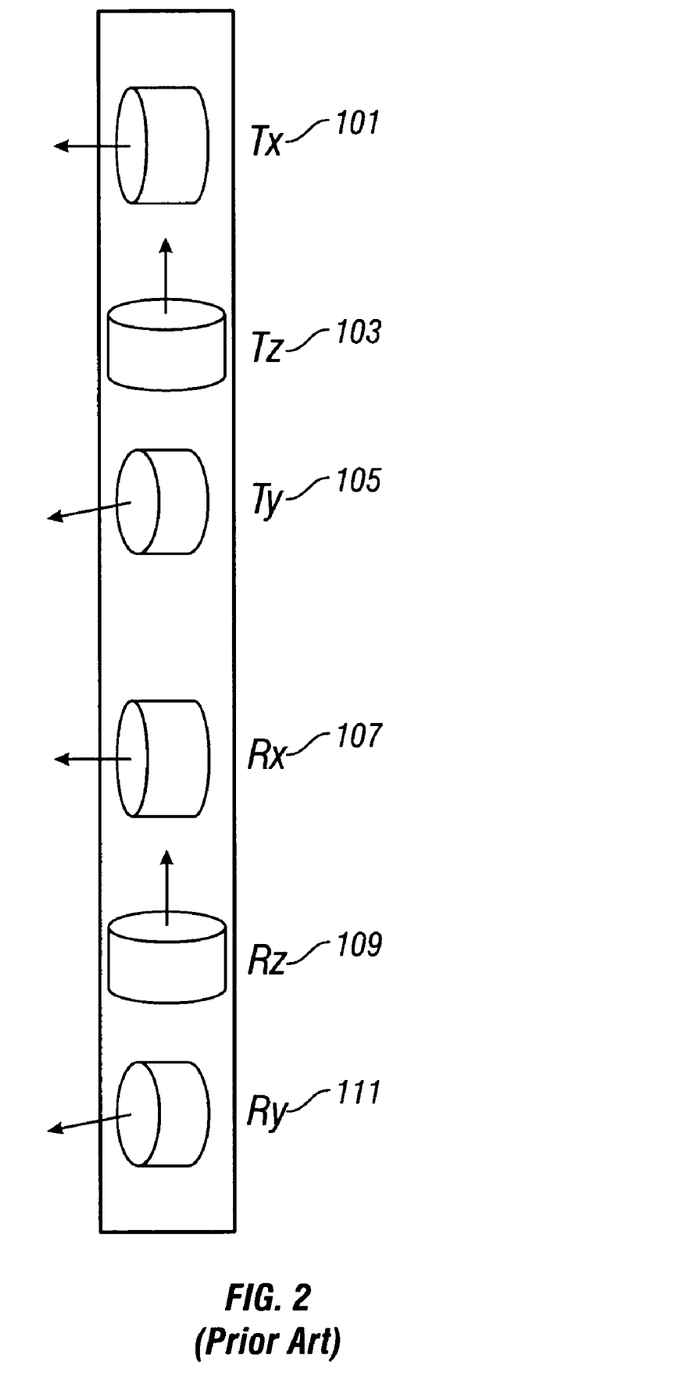
FIG. 2 (prior art) illustrates the arrangement of transmitter and receiver coils in multicomponent induction logging tool marketed under the name 3DExplorer™.

Referring to FIG. 2, the configuration of transmitter and receiver coils in the 3DExplorer□ multicomponent induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used. It should further be noted that measurements made with other coil inclinations may also be used for the method of the present invention using the well-known principles of coordinate rotation.

Figure 3:
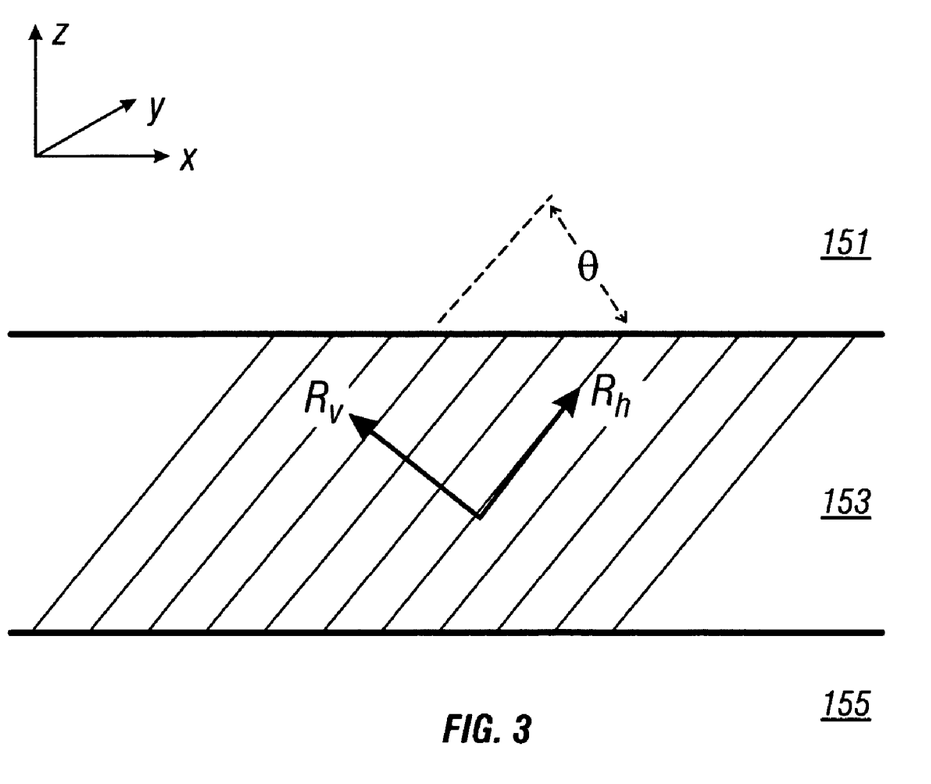
FIG. 3 illustrates a cross-bedded model used in the method of the present invention.

A cross-bedded formation is illustrated in FIG. 3. The upper layer 151 and the lower layer 155 are assumed to be isotropic, while the cross-bedded layer 153 is characterized by horizontal and vertical resistivities $R_h$ and $R_v$ parallel to and perpendicular to the cross-bedding. The cross-bedding has a normal that is inclined at an angle θ to the normal to the main bedding layers. The tool coordinate system is as shown in FIG. 3. θ is the angle between the cross-bedding and the main bedding (defined by the layers 151, 153, 155).

In the cross-bedding coordinate system, the resistivity is described by the model:

$$\sigma = \begin{bmatrix} \sigma_h & 0 & 0 \\ 0 & \sigma_h & 0 \\ 0 & 0 & \sigma_v \end{bmatrix}, \quad (1)$$

where $\sigma_h = 1/R_h$, and $\sigma_v = 1/R_v$.

In the tool coordinate system (with the tool in a vertical borehole normal to the main bedding), the conductivity tensor is given by $$\sigma^* = R\sigma R^T \quad (2),$$

where R is the rotation matrix given by $$R = \begin{bmatrix} \cos\theta & 0 & -\sin\theta \\ 0 & 1 & 0 \\ \sin\theta & 0 & \cos\theta \end{bmatrix}. \quad (3)$$

Expanding eqn. (2) gives $$\sigma^* = \begin{bmatrix} \sigma_h\cos^2\theta + \sigma_v\sin^2\theta & 0 & (\sigma_h - \sigma_v)\sin\theta\cos\theta \\ 0 & \sigma_h & 0 \\ (\sigma_h - \sigma_v)\sin\theta\cos\theta & 0 & \sigma_h\cos^2\theta + \sigma_v\sin^2\theta \end{bmatrix}. \quad (4)$$

Based on this, it is possible to evaluate the response of a multicomponent induction logging tool to a cross-bedded formation for various angles of cross-bedding.

The simple model in FIG. 3 is used to demonstrate two important effects: (1) the cross-bedding effect and (2) the shoulder-bed effect. In one model, the upper and lower beds are isotropic with 1 Ω-m resistivity. To define the resistivities for the cross bedding, it is assumed that the cross bedding results from variations in grain size and associated water saturation (Klein et al., 1995; Schöen et al., 2000). It is further assumed that the sands are bimodal: the porosity is $\phi_1$ for the coarse-grained component and $\phi_s$ for the fine-grained. The resistivities of the coarse and fine sands are given by Archie's equations:

$$R_{coarse} = R_w \frac{a}{\varphi_1^m S_{w1}^n}, \text{ and} \quad (5)$$

$$R_{fine} = R_w \frac{a}{\varphi_2^m S_{w2}^n}, \quad (6)$$

where $R_w$ is the pore fluid resistivity, a is a constant, m is the porosity exponent, n is the saturation exponent $S_{w1}$ and $S_{w2}$ are the water saturations. It should be noted that the use of the Archie equations is for exemplary purposes only, and that the resistivities for the coarse- and fine-grained components could be obtained by other methods.

The $R_h$ and $R_v$ of the cross bedding are then given by $$\frac{1}{R_h} = \frac{V_{coarse}}{R_{coarse}} + \frac{1 - V_{coarse}}{R_{fine}}, \quad (7)$$

and $$R_v = V_{coarse} R_{coarse} + (1 - V_{coarse}) R_{fine} \quad (8).$$

Eqns. (5)-(8) have been given by Klein.

Figure 4:
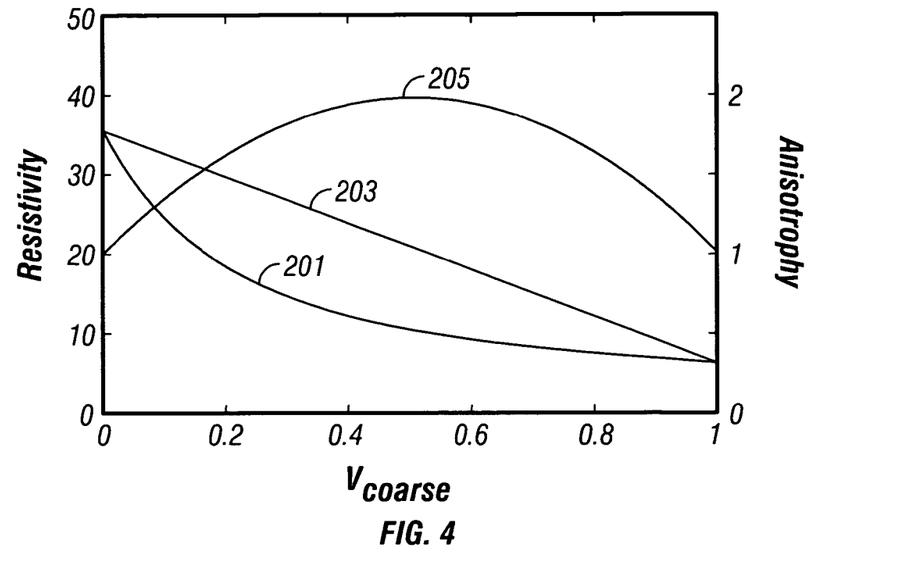
FIG. 4 shows an example of horizontal and vertical resistivities resulting from thin layering of isotropic layers.

FIG. 4 shows plots of the horizontal 201 and vertical 203 resistivities, and the anisotropy ratio 205 as a function of the volume fraction of the coarse-grain sand. These are for exemplary values of $R_w = 0.2$ Ω-m, $\phi_1 = 0.3$, $\phi_2 = 0.125$, $S_w = S_{w1} = S_{w2} = 0.6$, a=1. The resistivity values are in the coordinate system of cross-bedding. Note that $R_h$ and $R_v$ vary from 6.2 Ω-m to 36 Ω-m, depending on the volume fraction of coarse grains. The anisotropy ratio attains a maximum value of 2 when $V_{coarse}$ is 0.5. In that case, $R_h$ and $R_v$ are approximately 10 and 20 Ω-m, respectively.

Figure 5A:
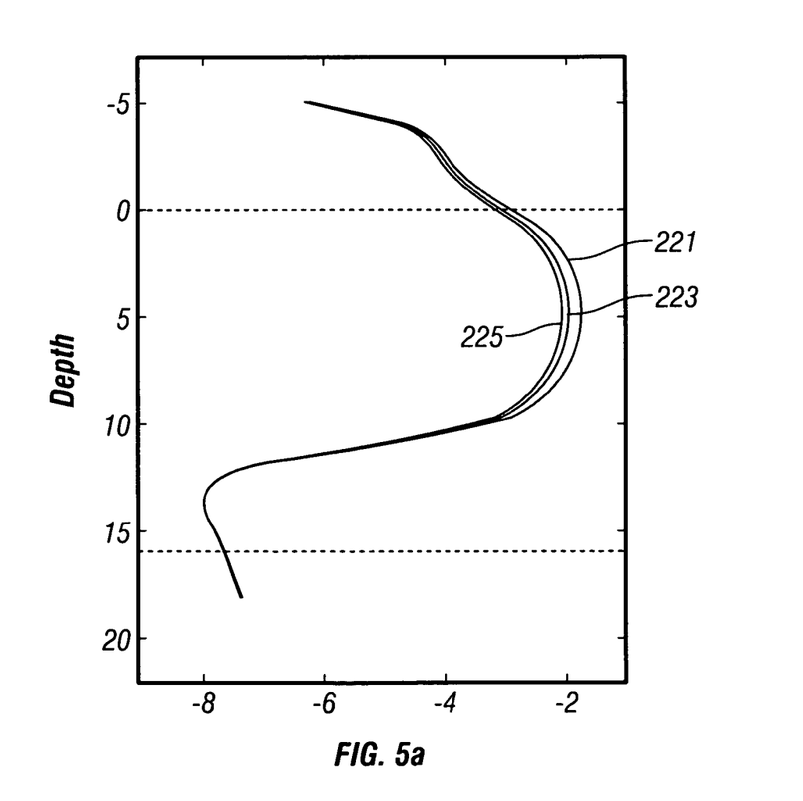
FIGS. 5a, 5b and 5c shows $H_{zz}$, $H_{xx}$ and $H_{yy}$ responses for an exemplary cross-bedded model at different angles of cross-bedding and a frequency of 125 kHZ.

FIG. 5a shows the Hzz responses for three 221, 223, 225 different cross-bedding angles (0°, 30°, 60°). Here, x, y, and z are in the tool coordinate system for a vertical tool as in FIG. 3. The cross-bedded layer is 16 ft thick. The tool configuration is that shown in FIG. 2 and the frequency is 125 kHz. It is noted that the Hzz response decreases in magnitude with the increasing bed dip angle, both inside and outside the cross bedded layers. This is understood because $H_{zz}$ is largely sensitive to the horizontal resistivity in the x-direction. As the dip angle increases, the horizontal resistivity increases and $H_{zz}$ decreases. Remarkably, the $H_{zz}$ response varies smoothly across the boundary between the upper and lower isotropic layer and the cross-bedded layer.

Figure 5B:
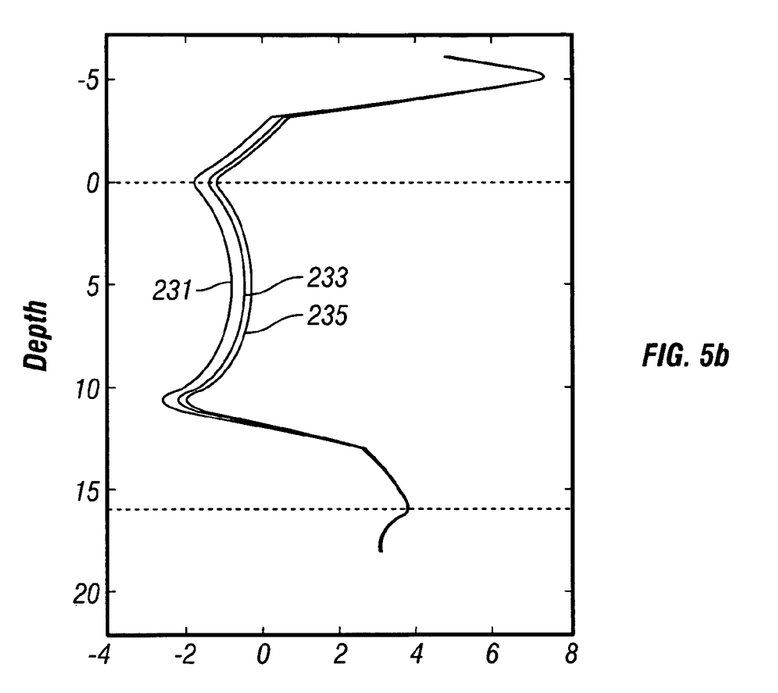
Figure 5C:
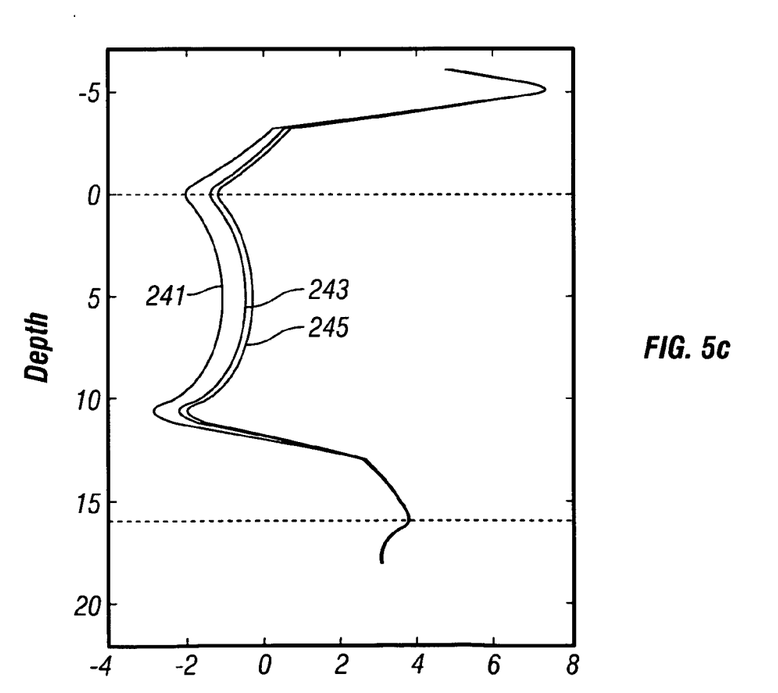

The Hxx responses 231, 233, 235 shown in FIG. 5b, and the $H_{yy}$ responses 241, 243, 245 shown in FIG. 5c increase in magnitude with the dip angle. This is understandable in view of the fact that in a vertical well $H_{xx}$ and $H_{yy}$ are largely inversely proportional to the vertical resistivity in the z-direction. As the dip angle increases, the vertical resistivity decreases while $H_{xx}$ and $H_{yy}$ increase. It is noted that the magnitudes increase both inside and outside the cross-bedded layer such that the curves for different dip angles preserve their orders. Both $H_{xx}$ and $H_{yy}$ exhibit transition across the bed boundaries, regardless of the cross-bedding dip angle. These sharp transitions correspond to the transmitter and/or receiver coils moving from one layer to another. The same is true at lower frequencies (not shown).

It should be emphasized that the relative dip angle in a cross-bedded formation is in general within 20-35°. The reason for simulating a much higher dip angle is that the borehole may penetrate a cross-bedded layer at an angle, making the apparent dips higher.

The above results were obtained with a 3-D modeling algorithm. Such modeling is often expensive and too time-consuming for practical data interpretation. In one embodiment of the invention, a weak-anisotropy approximation is used which simplifies the modeling and reduces the computation time. We note from field data that the small anisotropy ratio restriction is met by many multicomponent induction data seen to date.

We seek to approximate the $H_{xx}$, $H_{yy}$, and $H_{zz}$ responses to cross bedding with those of horizontal TI media. Each TI medium has at most two distinct resistivities, one parallel and the other normal to the bed boundaries. Here, the bed boundaries are not to be confused with the cross-bedding planes. Because $H_{xx}$, $H_{yy}$, and $H_{zz}$ have different responses to a cross-bedded formation, the approximate TI models must be different for different field components.

Our approximation consists of two steps. The first step is to ignore the off-diagonal terms in eqn. (4)

$$\sigma^* = \begin{bmatrix} \sigma_x^* & 0 & 0 \\ 0 & \sigma_y^* & 0 \\ 0 & 0 & \sigma_z^* \end{bmatrix}, \tag{9}$$

where $\sigma_x^* = \sigma_h \cos^2\theta + \sigma_v \sin^2\theta$, $\sigma_y^* = \sigma_h$, $\sigma_z^* = \sigma_h \sin^2\theta + \sigma_v \cos^2\theta$ (9a).

Because $\sigma_x^*$, $\sigma_y^*$ and $\sigma_z^*$ are in general different, the new medium is biaxially anisotropic. The validity of this approximation depends on the anisotropy ratio but not on $R_h$ or $R_v$ individually. The approximation is valid for small anisotropy ratios (<5).

From the biaxially symmetric anisotropic medium, it is possible to build a horizontal TI model. The induction current induced by a transmitter coil tends to flow in planes parallel to the transmitter coil plane. Hence the magnitude of the induction current will be dictated primarily by the conductive components in the plane. For instance, for an x-directed transmitter, the induction current should depend mainly on $\sigma_y^*$ and $C_z^*$. This hypothesis roots in the long-recognized observation that the axial induction measurement in a vertical well is related only to the horizontal resistivity of the formation.

Following the above discussion, the equivalent TI models for Hxx and Hyy may be written as:

$$\sigma_{Hxx} = \begin{bmatrix} \sigma_y^* & 0 & 0 \\ 0 & \sigma_y^* & 0 \\ 0 & 0 & \sigma_z^* \end{bmatrix}, \text{ and} \tag{10}$$

$$\sigma_{Hyy} = \begin{bmatrix} \sigma_x^* & 0 & 0 \\ 0 & \sigma_x^* & 0 \\ 0 & 0 & \sigma_z^* \end{bmatrix}. \tag{11}$$

For Hzz, the approximation is slightly different because the two conductivity components in the horizontal plane ($\sigma_x^*$ and $\sigma_y^*$) must be reduced to one component. Using Worthington's (1981) conjecture, we calculate an effective horizontal conductivity $\sqrt{\sigma_x^* \sigma_y^*}$, and write the equivalent TI model for $H_{zz}$ as $$\sigma_{Hzz} = \begin{bmatrix} \sqrt{\sigma_x^* \sigma_y^*} & 0 & 0 \\ 0 & \sqrt{\sigma_x^* \sigma_y^*} & 0 \\ 0 & 0 & \sigma_z^* \end{bmatrix}. \tag{12}$$

Because Hzz does not depend on the vertical conductivity, we can simply replace the conductivity tensor with a scalar $$\sigma_{Hzz} = \sqrt{\sigma_x^* \sigma_y^*} = \sqrt{\sigma_h \sigma_v \sin^2\theta + \sigma_h^2 \cos^2\theta}$$

Eqn. (13) is the apparent conductivity formula given by Moran and Gianzero (1979) for coaxial-coil measurements in a deviated well.

Figure 6A:
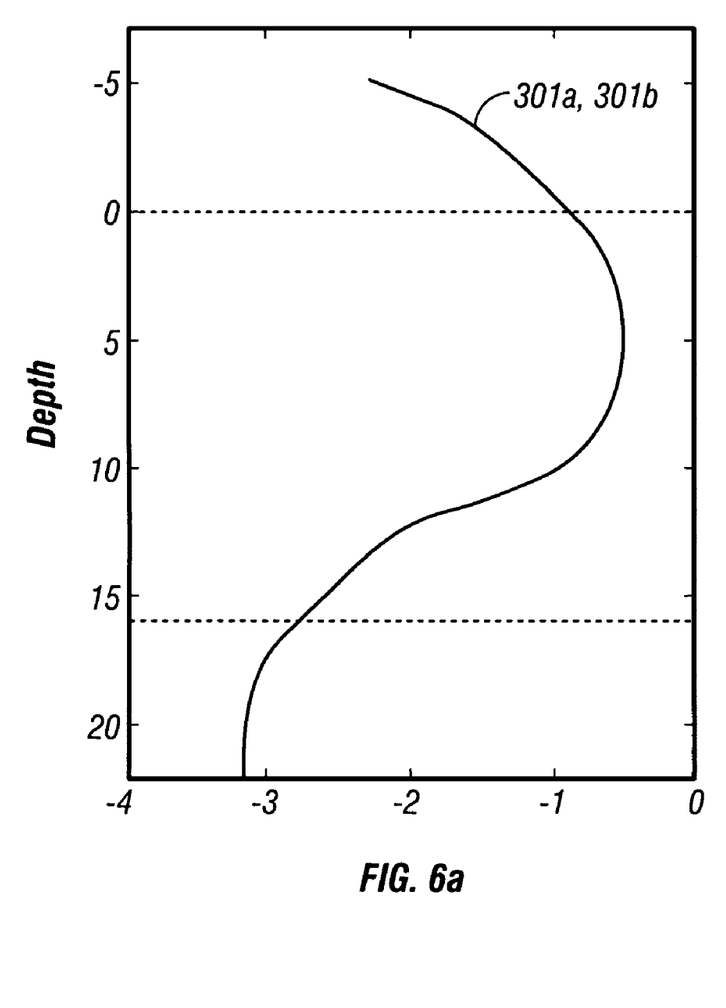
FIGS. 6a, 6b show a comparison between actual $H_{zz}$ responses and an $H_{zz}$ response of an approximate TI model at 21 kHz and 125 kHz.

FIG. 6a gives a comparison of the $H_{zz}$ component 301a, 301b for the cross-bedded model using the approximation of eqn (13) with the actual response at 21 kHz. The two curves are virtually indistinguishable.

Figure 6B:
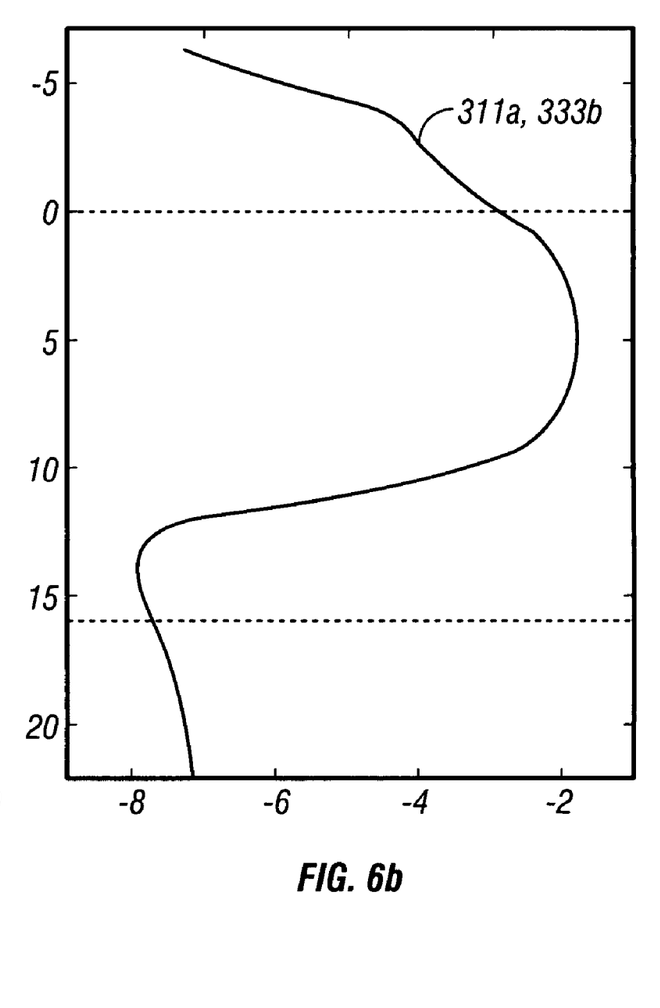
Figure 6C:
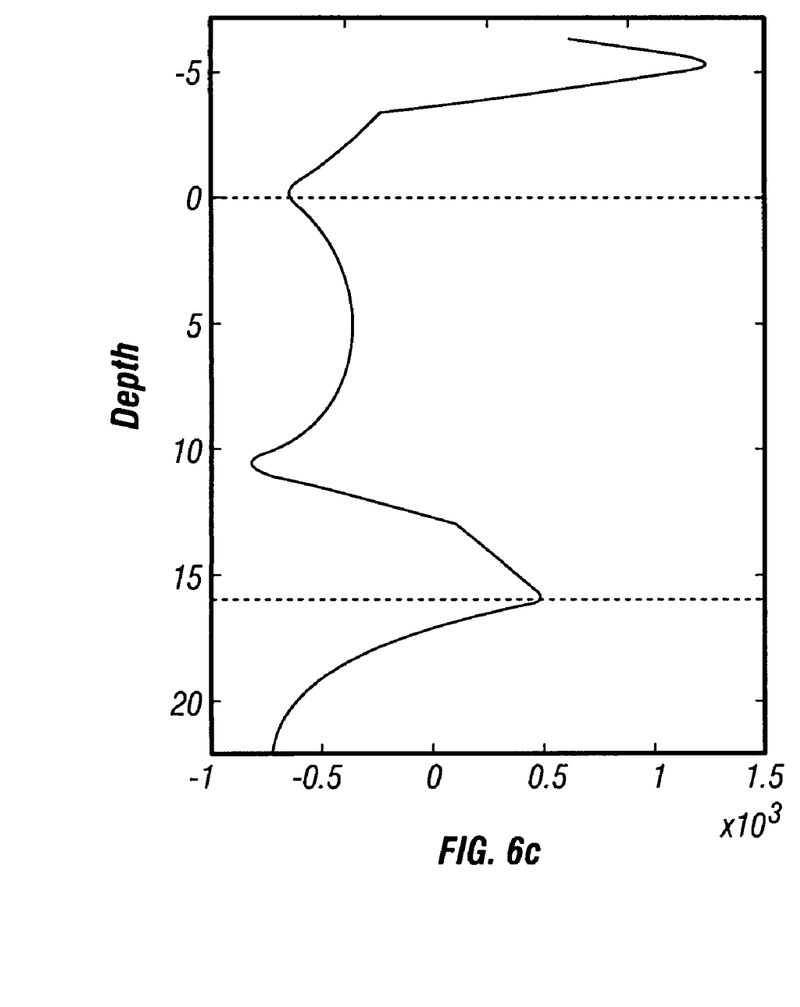
FIGS. 6c, 6d show a comparison between actual $H_{xx}$ responses and an $H_{yy}$ response of an approximate TI model at 21 kHz and 125 kHz.
Figure 6D:
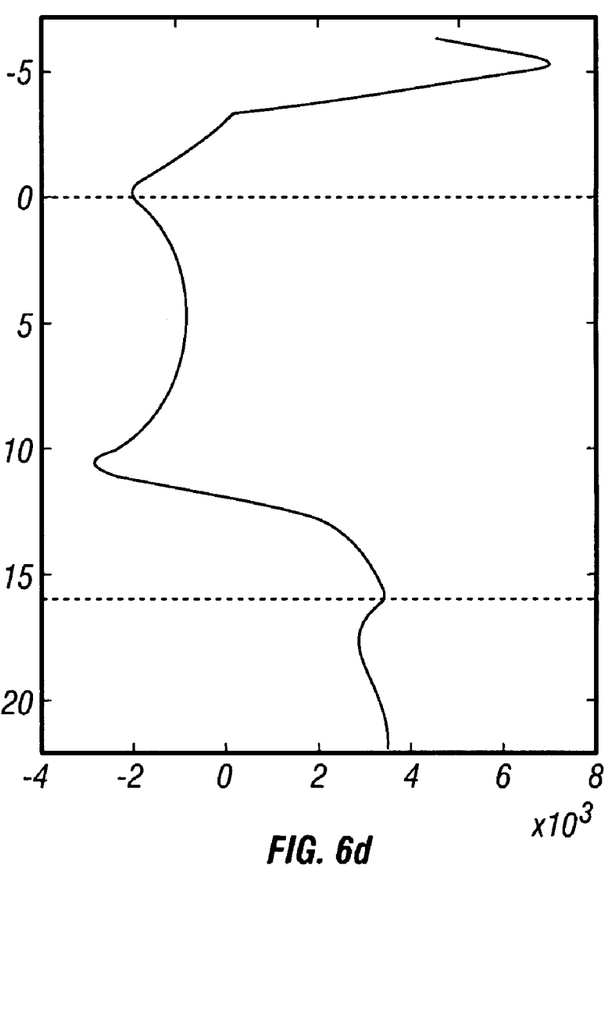
Figure 6E:
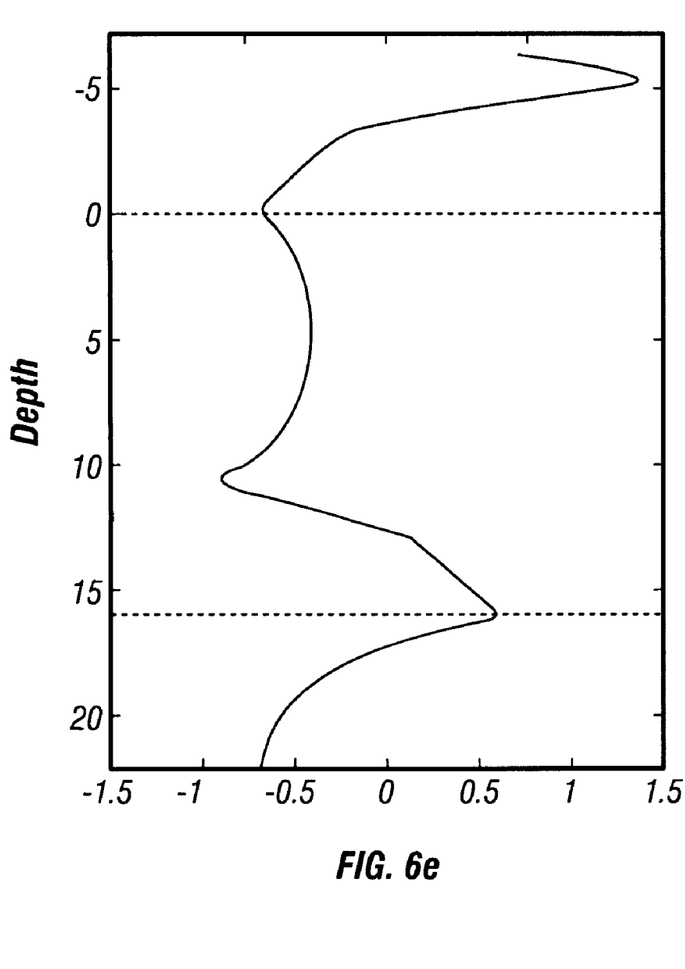
FIGS. 6e, 6f show a comparison between actual $H_{yy}$ responses and an $H_{yy}$ response of an approximate TI model at 21 kHz and 125 kHz.
Figure 6F:
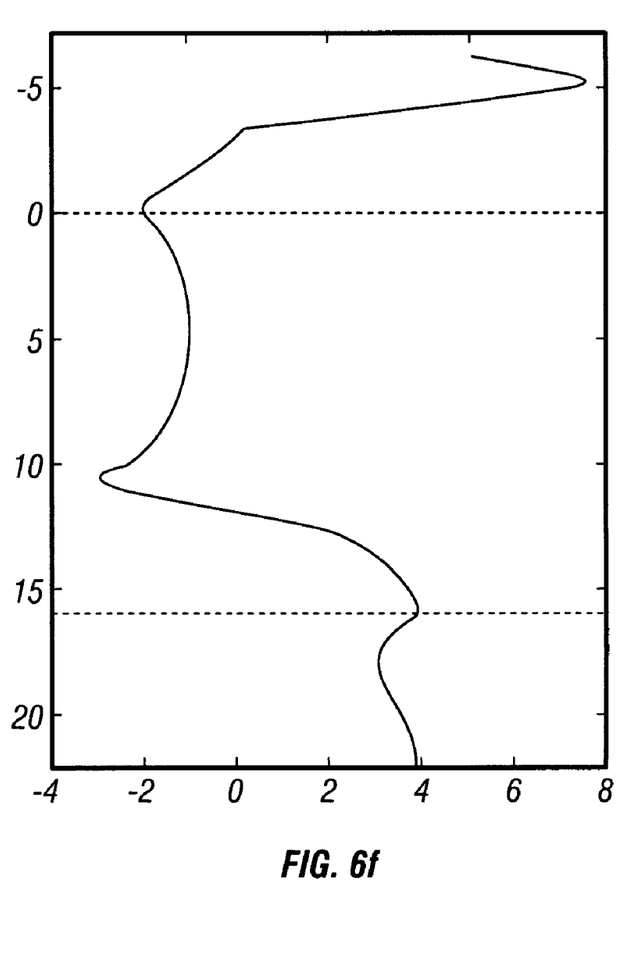

FIG. 6b gives a comparison of the $H_{zz}$ component 311a, 311b for a frequency of 125 kHz. Again, the two curves are virtually indistinguishable. FIGS. 6c and 6d give comparisons of the approximate $H_{xx}$ component using the TI approximation and the actual results for 21 kHz and 125 kHz. FIGS. 6e and 6f give comparisons of the approximate $H_{yy}$ component using the TI approximation and the actual results for 21 kHz and 125 kHz.

In one embodiment of the invention, 3DEX measurements made in a near vertical from measurements made with a micro-resistivity imager or an acoustic imaging tool. The estimated value of θ and the measured $\sigma_{Hzz}$ may then be used to determine $\sigma_h$ and $\sigma_v$, the horizontal and vertical resistivities associated with the cross bedding from eqn. (13). Similar methods may be used with $\sigma_{Hxx}$ and $\sigma_{Hyy}$ and eqns. (10)-(11), or a combination of two or more of eqns. (10)-(13) may be used. It should be noted that if two or more of eqns(11)-(13) are used, then an independent measurements of the cross-bedding angle θ need not be made using an imaging tool as the system of equations enables determination of θ. Thus, it is possible to determine the cross-bedding angle and the horizontal and vertical conductivities of cross-bedding from either:

(1) determination of a TI model associated with a single principal component and an independently determined cross-bedding angle from an imaging tool, or (2) determination of a TI model associated with two or more principal components.

Once the cross-bedding resistivity parameters have been determined, further processing may be done to determine petrophysical parameters characterizing the cross-bedding using known methods. Determination of water saturation and of fractional volumes of sand and shale components is discussed, for example, in U.S. Pat. Nos. 6,711,502, 6,493,632 and 6,470,274 to Mollison et al, having the same assignee as the present invention.

Mollison '274 teaches determination of the total porosity of a formation, a fractional volume of the shale, water saturation, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. NMR data are used to obtain measurements of the total clay-bound water in the formation and the clay bound water in shales in the formation. Mollison '502 teaches determination of the total porosity of a formation, a fractional volume of the shale, and a resistivity of the shale in a laminated reservoir including sands that may have dispersed shales therein. A tensor petrophysical model determines the laminar shale volume and laminar sand conductivity from vertical and horizontal conductivities derived from multi-component induction log data. The volume of dispersed shale and the total and effective porosities of the laminar sand fraction are determined using a Thomas-Stieber-Juhasz approach. Removal of laminar shale conductivity and porosity effects reduces the laminated shaly-sand problem to a single dispersed shaly-sand model to which the Waxman-Smits equation can be applied.

In one embodiment of the invention, use is made of the method taught in U.S. Pat. No. 6,686,736 to Schoen et al., having the same assignee as the present invention and the contents of which are incorporated herein by reference. Taught therein is a method for determining the coarse- and fine-grained fraction of a laminated sequence and estimation of permeabilities of the coarse- and fine-grained components.

Figure 7:
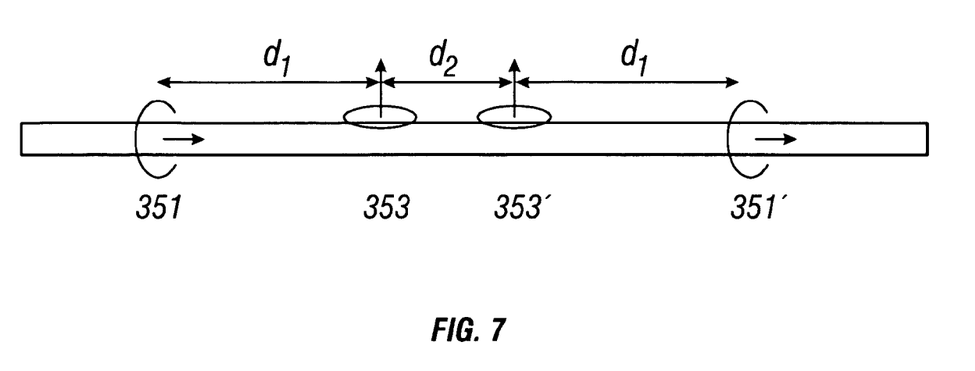
FIG. 7 illustrates a transmitter and receiver configuration suitable for use for MWD applications.

One embodiment of the invention uses measurements made during drilling. U.S. patent application Ser. No. ***** filed on 9 Dec. 2005 of Yu et al. under the Attorney Docket No. 414-40476 teaches the use of a tool in which a pair of z-coils is symmetrically disposed about a pair of x-coils. This is illustrated in FIG. 7. The tool comprises two coils 251, 251' whose dipole moments are parallel to the tool axis direction and two coils 253, 253' that are perpendicular to the transmitter direction. In one embodiment of the invention, the tool operates at 400 kHz frequency. When the first transmitter fires, the two receivers measure the magnetic field produced by the induced current in the formation. This is repeated for, the second transmitter. The signals are combined in following way:

$$H_{T1} = H_2 - (d_1/(d_1+d_2))^3 \cdot H_1$$

$$H_{T2} = H_1 - (d_1/(d_1+d_2))^3 \cdot H_2 \qquad (1).$$

Here, $H_1$ and $H_2$ are the measurements from the first and second receivers, respectively, and the distances $d_1$ and $d_2$ are as indicated in FIG. 7. The tool rotates with the BHA and in an exemplary mode of operation, makes measurements in 16 angular orientations 22.5° apart. The measurement point is at the center of two receivers.

With the tool of FIG. 7, it is possible to get a full suite of measurements. Hence, 'zx' and 'xx' arrays will generate zx (xz), zy (yz), xx and yy measurements. Also, by arranging the transverse coils in orthogonal directions, we will generate xy (yx) data. Therefore, by combining zz data, we'll have a full tensor of measurement that is sufficient to resolve all resistivities and the associated dipping and inclination angles.

The invention has been described above with reference to a device that is conveyed on a wireline into the borehole. The method of the invention may also be used with a multicomponent induction logging device conveyed into a borehole on a tubular, such as a drillstring. The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole.

Implicit in the control and processing of the data is the use of a computer program on a suitable machine readable medium that enables the processor to perform the control and processing. The machine readable medium may include ROMs, EPROMs, EEPROMs, Flash Memories and Optical disks.

The following definitions may be helpful in understanding the present invention:
cross-bedding: the arrangement of laminations of strata transverse or oblique to the main bedding of the strata concerned;
cross-bedding angle: angle between the cross-beds and the main beds;
EAROM: electrically alterable ROM;
EPROM: erasable programmable ROM;
flash memory: a nonvolatile memory that is rewritable;
induction: based on a relationship between a changing magnetic field and the electric field created by the change;
logging tool: The downhole hardware needed to make a log. The term is often shortened to simply "tool.";
machine readable medium: something on which information may be stored in a form that can be understood by a computer or a processor;
multicomponent resistivity measurement: a measurement obtained with a different transmitter and receiver orientation; also includes measurements made with different orientations of parallel transmitter-receiver pairs;
Optical disk: a disc shaped medium in which optical methods are used for storing and retrieving information;
Principal component: measurement made with the transmitter and receiver oriented along one of the three principal directions (x-, y- and z-);
ROM: Read-only memory;
Resistivity: electrical resistance of a conductor of unit cross-sectional area and unit length. Determination of resistivity is equivalent to determination of its inverse (conductivity);

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating a cross-bedded interval in an earth formation, the method comprising:
   (a) obtaining a resistivity measurement in a borehole in the earth formation;
   (b) representing the cross-bedded interval by a model having anisotropy relative to a main bedding;

(c) using the model for estimating from the measurement a value of property of the interval; and (d) recording the estimated property on a suitable medium.

2. The method of claim 1 wherein the model comprises a bi-axially anisotropic model.

3. The method of claim 1 wherein the borehole has an axis substantially normal to the main bedding of the earth formation.

4. The method of claim 1 wherein estimating the value of the property further comprises:

(i) determining an angle of cross-bedding, and (ii) using the angle of cross-bedding to determine a horizontal conductivity and a vertical conductivity characterizing the cross-bedding.

5. The method of claim 4 wherein determining the angle of cross-bedding further comprises using at least one of (A) an acoustic imaging tool, and (B) a micro-resistivity imager.

6. The method of claim 4 estimating the value of the property further comprises estimating at least one of (A) a water saturation of the cross-bedded interval, (B) a shale fraction of the cross-bedded interval, (C) a coarse grained fraction of the cross-bedded interval, (D) a fine grained fraction of the cross-bedded interval, (E) a permeability of a fine grained fraction of the cross-bedded interval, (F) a permeability of a coarse grained fraction of the cross-bedded interval; (G) a horizontal resistivity of the interval, and (H) a vertical resistivity of interval.

7. The method of claim 1 wherein obtaining the resistivity measurement further comprises using a multicomponent tool.

8. The method of claim 7 wherein the measurement comprises a principal component.

9. An apparatus for evaluating a cross-bedded interval in an earth formation, the apparatus comprising:

(a) a logging tool a configured to make a measurement of the interval; and (b) a processor configured to:

(A) use a model having anisotropy relative to a main bedding to estimate from the measurement a value of a property of the interval, and (B) record the estimated value on a suitable medium.

10. The apparatus of claim 9 wherein the model comprises a bi-axially anisotropic model.

11. The apparatus of claim 9 wherein the borehole has an axis substantially normal to the main bedding of the earth formation.

12. The apparatus of claim 9 wherein the processor is further configured to estimate the value of the property by:

(i) determining an angle of cross-bedding, and (ii) using the angle of cross-bedding to estimate a horizontal conductivity and a vertical conductivity characterizing the cross-bedding.

13. The apparatus of claim 12 further comprising an imaging tool selected from the group consisting of: (I) an acoustic imaging tool, and (II) a resistivity imaging tool; and wherein the processor is configured to determine the angle of cross-bedding based at least in part on an output of the imaging tool.

14. The apparatus of claim 12 wherein the property is at least one of (I) a water saturation of the cross-bedded interval, (II) a shale fraction of the cross-bedded interval, (III) a coarse grained fraction of the cross-bedded interval, (IV) a fine grained fraction of the cross-bedded interval, (V) a permeability of a fine grained fraction of the cross-bedded interval, (VI) a permeability of a coarse grained fraction of the cross-bedded interval, (VII) a horizontal resistivity of the interval, and (VIII) a vertical resistivity of interval.

15. The apparatus of claim 9 further comprising a conveyance device configured to convey the logging tool into a borehole, the conveyance device being selected from (i) a wireline, (ii) a drilling tubular, and (iii) a slickline.

16. The apparatus of claim 9 wherein the processor is at one of (i) a downhole location, (ii) a surface location, and (iii) a remote location.

17. The apparatus of claim 9 wherein the logging tool comprises a multicomponent tool.

18. The apparatus of claim 17 wherein the measurement comprises a principal component.

19. A computer readable medium for use with an apparatus for evaluating a cross-bedded interval in an earth formation, the apparatus comprising:

(a) a logging tool configured to obtain a measurement of the interval;

the medium comprising instructions which enable a processor to:

(b) use a model having anisotropy relative to a main bedding to estimate from the measurement a value of a property of the interval, and (c) record the estimated value on a suitable medium 1.

20. The medium of claim 19 further comprising at least one of (i) a ROM, (ii) an EPROM, (iii) an EEPROM, (iv) a flash memory, and (v) an optical disk.

* * * * *